(12) United States Patent
Schuerholz et al.

(10) Patent No.: US 12,392,147 B2
(45) Date of Patent: Aug. 19, 2025

(54) MOBILE CONCRETE PUMP

(71) Applicant: Putzmeister Engineering GmbH, Aichtal (DE)

(72) Inventors: Michaela Schuerholz, Vellmar (DE); Gerald Reichenbach, Gründau (DE); Tobias Huth, Stuttgart (DE); Christian Ziemens, Aichtal (DE)

(73) Assignee: Putzmeister Engineering GmbH, Aichtal (DE)

( * ) Notice: Subject to any disclaimer, the term of this patent is extended or adjusted under 35 U.S.C. 154(b) by 826 days.

(21) Appl. No.: 17/626,754

(22) PCT Filed: Jul. 8, 2020

(86) PCT No.: PCT/EP2020/069213
§ 371 (c)(1),
(2) Date: Jan. 12, 2022

(87) PCT Pub. No.: WO2021/008958
PCT Pub. Date: Jan. 21, 2021

(65) Prior Publication Data
US 2022/0235565 A1    Jul. 28, 2022

(30) Foreign Application Priority Data
Jul. 12, 2019  (DE) .............. 10 2019 118 902.0

(51) Int. Cl.
*E04G 21/04*    (2006.01)
*B66C 23/78*    (2006.01)
(Continued)

(52) U.S. Cl.
CPC ..... *E04G 21/0436* (2013.01); *E04G 21/0463* (2013.01); *G01S 19/42* (2013.01); *B66C 23/80* (2013.01)

(58) Field of Classification Search
CPC ............ E04G 21/0463; E04G 21/0436; E04G 21/0445; E04G 21/02; B66C 23/78;
(Continued)

(56) References Cited

U.S. PATENT DOCUMENTS 5,823,218 A * 10/1998 Schlecht ............... B66C 23/005
91/363 R
6,202,013 B1 * 3/2001 Anderson ........... E04G 21/0436
701/50
(Continued)

FOREIGN PATENT DOCUMENTS

CN    105692484 A    6/2016
CN    109791045 A    5/2019
(Continued)

OTHER PUBLICATIONS

PCT International Search Report and Written Opinion for International application No. PCT/EP2020/069213 filed Jul. 8, 2020, Date of Mailing: Oct. 20, 2020, 12 pgs.
(Continued)

*Primary Examiner* — Jeffrey P Aiello
(74) *Attorney, Agent, or Firm* — Alix, Yale & Ristas, LLP

(57) ABSTRACT

The invention relates to a method for detecting and verifying a working position of a mobile concrete pump, said method comprising the steps: a) setting up and at least partially supporting the concrete pump at a set-up position; b) detecting position-related data of a working position, wherein the working position is located in a region of a surface to be concreted which is remote from the set-up position; c) comparing the position-related data with a theoretical working area resulting from the set support; and d) outputting a signal as to whether the working position can be operated. This makes it possible to set up or support a mobile concrete pump in the most optimal manner possible. The invention (Continued)

also relates to a method for determining a suitable support setting, a measurement device, and a mobile concrete pump.

24 Claims, 2 Drawing Sheets

(51) Int. Cl.
*E04G 21/02* (2006.01)
*F04B 15/02* (2006.01)
*G01C 3/00* (2006.01)
*G01S 19/42* (2010.01)
*B66C 23/80* (2006.01)

(58) Field of Classification Search
CPC ......... B66C 23/80; B66C 13/40; G01S 19/42; G01S 19/40; E21B 41/00
USPC .................. 701/50; 702/150, 41, 42, 127
See application file for complete search history.

(56) References Cited

U.S. PATENT DOCUMENTS

| | | | | |
|---|---|---|---|---|
| 2010/0324824 | A1* | 12/2010 | Gelies | B66F 17/006 |
| | | | | 702/5 |
| 2015/0176608 | A1* | 6/2015 | Fuegel | B66C 23/80 |
| | | | | 280/830 |
| 2015/0249821 | A1* | 9/2015 | Tanizumi | B60R 1/31 |
| | | | | 348/46 |
| 2017/0167149 | A1* | 6/2017 | Vierkotten | E04G 21/0445 |
| 2022/0244045 | A1* | 8/2022 | Cejka | G01S 7/4026 |

FOREIGN PATENT DOCUMENTS

| | | | | |
|---|---|---|---|---|
| DE | 4412643 | A1 | 3/1995 | |
| DE | 102006031257 | A1 | 1/2008 | |
| DE | 102007008881 | A1 * | 8/2008 | ............ B66C 13/40 |
| DE | 102008055625 | A1 | 5/2010 | |
| DE | 102012011871 | A1 | 12/2013 | |
| DE | 102013006258 | A1 | 10/2014 | |
| DE | 102014105618 | A1 | 10/2015 | |
| DE | 102014009165 | A1 | 12/2015 | |
| DE | 102016125450 | A1 | 6/2018 | |
| EP | 1356910 | B1 | 10/2016 | |
| JP | 2014151979 | A | 8/2014 | |
| JP | 201884084 | A | 5/2018 | |
| WO | 2012159514 | A1 | 11/2012 | |
| WO | WO-2014029517 | A1 * | 2/2014 | ............ B66C 23/78 |
| WO | 2018115270 | A1 | 6/2018 | |

OTHER PUBLICATIONS

Chinese Second Office Action for Application No. 202080048802.3; Dated: Jun. 1, 2023; 10 pgs.

Yaxing Yi, et al.; "Light Spot Positioning Technology"; National Defense Industry Press, ISBN 978-7-118-11400-3, published in Nov. 2017; Excerpt—pp. 9 and 10; 4 ppgs.—English Machine Translation not available.

PCT International Preliminary Report on Patentability for International Application No. PCT/EP2020/069213 filed Jul. 8, 2020, Date of Issuance: Jan. 18, 2022; 13 pgs.

* cited by examiner

MOBILE CONCRETE PUMP

BACKGROUND

The invention relates to a method for detecting and verifying a working position of a mobile concrete pump and to a method for determining a suitable support setting for a mobile concrete pump, and to a measuring device and a mobile concrete pump.

Mobile concrete pumps or truck-mounted concrete pumps are known from the prior art for the delivery of concrete. A truck-mounted concrete pump generally consists of a truck chassis, a pump system, and a concrete placing boom. The placing boom has individual boom arms which are connected to one another via articulated joints with large angular ranges and, together with a slewing gear with a large slewing angle (for example, more than 360°), offer a high degree of flexibility when transporting the concrete to a placing location (working position) but also, for example, over obstacles. In general, an approximately circular area around the concrete pump can be served using the placing boom.

Support legs, which are generally equipped with hydraulic support cylinders, are provided in order to ensure the required stability, inter alia during the delivery of the concrete. Depending on the construction, the support legs are extended or folded out (from a driving position into a supporting position) by hydraulic cylinders or hydraulic motors. The hydraulic control system can be operated on the concrete pump or via a portable remote control unit.

Different types of support (diagonal support, swing-out support, one-side support) are known, wherein the space requirement (necessary support surface and support distance) for the support varies depending on the design of the concrete pump and the size of the placing boom. The working range of the placing boom can be restricted depending on the support. A safety circuit ensures that the placing boom is stopped before it moves into a dangerous surface and there is a risk of the concrete pump tipping over. The working range of the placing boom can be modified or enlarged by setting an optimum support.

When approaching a concreting location, there is often a problem of finding a suitable set-up position for the mobile concrete pump such that a surface to be concreted can be served as completely as possible from a set-up position in one working step. Repositioning during the concreting, for example by moving the concrete pump, entails not only an unnecessary loss of time but also different properties of the concrete to be cured and therefore should be avoided. The machine is positioned and supported—within certain limits predetermined by the construction site—only by an experienced operator making an estimation. Determining an optimum set-up position and support by estimating is prone to error and generally means that time-consuming repositioning is required at least once.

SUMMARY OF THE INVENTION

The object of the present invention is thus to obtain an improved set-up and support of the mobile concrete pump.

The object is achieved by the alternative method as claimed in claims 1 and 2, a measuring device as claimed in claim 12, and a concrete pump as claimed in claim 13.

First, some terms are defined.

A surface to be concreted or a concreting surface is understood to be an area on which it is intended for concrete to be applied. The surface to be concreted can have any form. The surface to be concreted can take the form of one or multiple parts. Depending on the set-up position of a concrete pump and the geometry of the surfaces to be concreted, the surface to be concreted has an area close to the set-up position and an area remote from the set-up position. The area close to the set-up position is generally arranged adjacent to the concrete pump and can, for example, also be detected by sensors arranged on the concrete pump. The remote area is further away from the set-up position of the concrete pump than the close area.

A working position of a concrete pump is understood to mean an intended concreting location which is arranged inside or adjoining the surface to be concreted. A working distance is consequently defined as the distance between the working position and the set-up position of the concrete pump. Within the context of the following description, for the sake of simplicity the set-up position is defined at the central pivot point of the slewing gear of a mobile concrete pump. It is, however, also possible to define a different fixed reference point of the concrete pump.

Position-related data are to be understood to mean all the relative and absolute data which allow conclusions to be drawn about the location of a working position or a set-up position, or the distance between them. In its simplest form, the working distance with no directional information is included but the data are preferably satellite-based GPS coordinates or relative coordinates of the concrete pump.

A theoretical working range of the concrete pump is understood to mean the area surrounding the concrete pump which the concrete pump can serve from its set-up position. The theoretical working range is regardless of any obstacles on the construction site (for example, trees). The theoretical working range is generally approximately circular or spherical, the size and shape depending on the design of the placing boom and the set support of the concrete pump.

The method according to the invention for detecting and verifying a working position comprises the steps:

setting up and at least partially supporting the concrete pump at a set-up position, detecting position-related data on a working position, in particular a working distance between the set-up position and the working position, wherein the working position is arranged in an area, remote from the set-up position, of a surface to be concreted, comparing the position-related data with a theoretical working range of the concrete pump, resulting from the set support, outputting a signal indicating whether the working position can be served by the concrete pump.

The method makes it possible to compare the theoretical working range of the concrete pump with an on-site working position. The prior measurement of the working position provides information as to whether the working position can be served by the concrete pump or whether a different set-up position or parking position needs to be chosen. In particular, there is no need for time-consuming repositioning of the concrete pump while the concrete is being applied. The method can be performed locally on the construction site and irrespective of further information on the construction site (such as satellite images, for example) or the experience of an operator.

In order to detect the position-related data of the working position, an operator can stand at the working position together with a portable unit such as, for example, a remote control unit of the concrete pump. The data can be transmitted at the same time as or subsequent to the measurement and be compared with previously stored data.

The invention moreover relates to a method for determining a support setting of a mobile concrete pump with the steps:

setting up the concrete pump at a set-up position, detecting position-related data on a working position, in particular a working distance between the set-up position and the working position, determining a support setting based on the position-related data, outputting the support setting.

The method enables an operator to find an optimum support setting which makes it possible to reach a working position. The method is broadly identical to the method for detecting and verifying a working position with the difference that the concrete pump is not yet supported. The position-related data are detected by means of a portable unit in a similar fashion to a remote control unit for the concrete pump. The optimum support position is determined based on stored values for support settings and associated working ranges of the concrete pump. The working position is preferably situated in an area, remote from the set-up position, of a surface to be concreted.

The support setting is preferably output with reference to a support surface of the concrete pump on site and the support surface is more preferably detected by means of a camera arranged on the concrete pump. The support surface is that area around the concrete pump which is used for the support. The support surface can be restricted by obstacles on the construction site, such as trees or other equipment. It is therefore often necessary to check a proposed support setting with regard to the local circumstances.

In an advantageous embodiment, the support setting is projected onto the support surface on site by optical means provided on the concrete pump. This allows an operator to check easily whether a suitable support setting can be implemented on site.

Position-related data is preferably detected with the aid of GPS coordinates. GPS coordinates can be detected everywhere by means of a GPS receiver and irrespective of specific circumstances on the construction site. Not only can the relative working distance be detected with the aid of the GPS coordinates but so too can the precise position including any differences in height. This is advantageous because the height of the surface to be concreted (garage, 5th story of a building) likewise has an influence on the optimum set-up position and the support.

The working distance between the working position and the set-up position is determined by light, such as a laser beam or radar. To do this, corresponding devices must be present on the concrete pump itself and on an operator's portable unit. Various methods of distance measurement are known from the prior art.

The method can be repeated for different working positions inside or adjoining the surface to be concreted. It has been shown to be advantageous to measure at least corner points of the surface to be concreted on a side remote from the concrete pump. It is thus ensured that the whole surface to be concreted can be reliably served by the concrete pump.

It has additionally proved to be advantageous to measure working positions along an edge of the surface to be concreted. In this way, the surface to be concreted can be interpolated completely from the recorded values. Information about the size of the surface to be concreted makes it possible to estimate the amount of concrete to be delivered.

The detection of position-related data at various working positions can be detected continuously at discrete intervals or with input from a user. This depends essentially on the contour of the surface to be concreted. Measuring the corner points is generally sufficient in the case of simple geometries such as squares or rectangles. The surface to be concreted is interpolated with the aid of the corner points.

It is additionally possible to detect a surface to be concreted, including interfering contours, with the aid of the position-related data. To do this, the interfering contours also need to be detected, wherein a height can be input manually by the operator.

In an advantageous embodiment, the operator receives immediate feedback when detecting the position-related data, namely in such a way that the signal or the support setting is output directly on a portable remote control unit.

The invention furthermore relates to a measuring device for detecting and verifying a working position of a mobile concrete pump designed to perform the above described method.

The invention moreover relates to a mobile concrete pump with a placing boom and the measuring device according to the invention.

The placing boom is preferably guided automatically, based on the position-related data of the surface to be concreted.

The measuring device and concrete pump according to the invention can be developed with further features described in connection with the method according to the invention. The method according to the invention can be developed with further features described in connection with the measuring device and concrete pump according to the invention.

BRIEF DESCRIPTION OF THE DRAWINGS

The invention is described by way of example below with the aid of exemplary embodiments with reference to the attached drawings.

DETAILED DESCRIPTION

Figure 1:
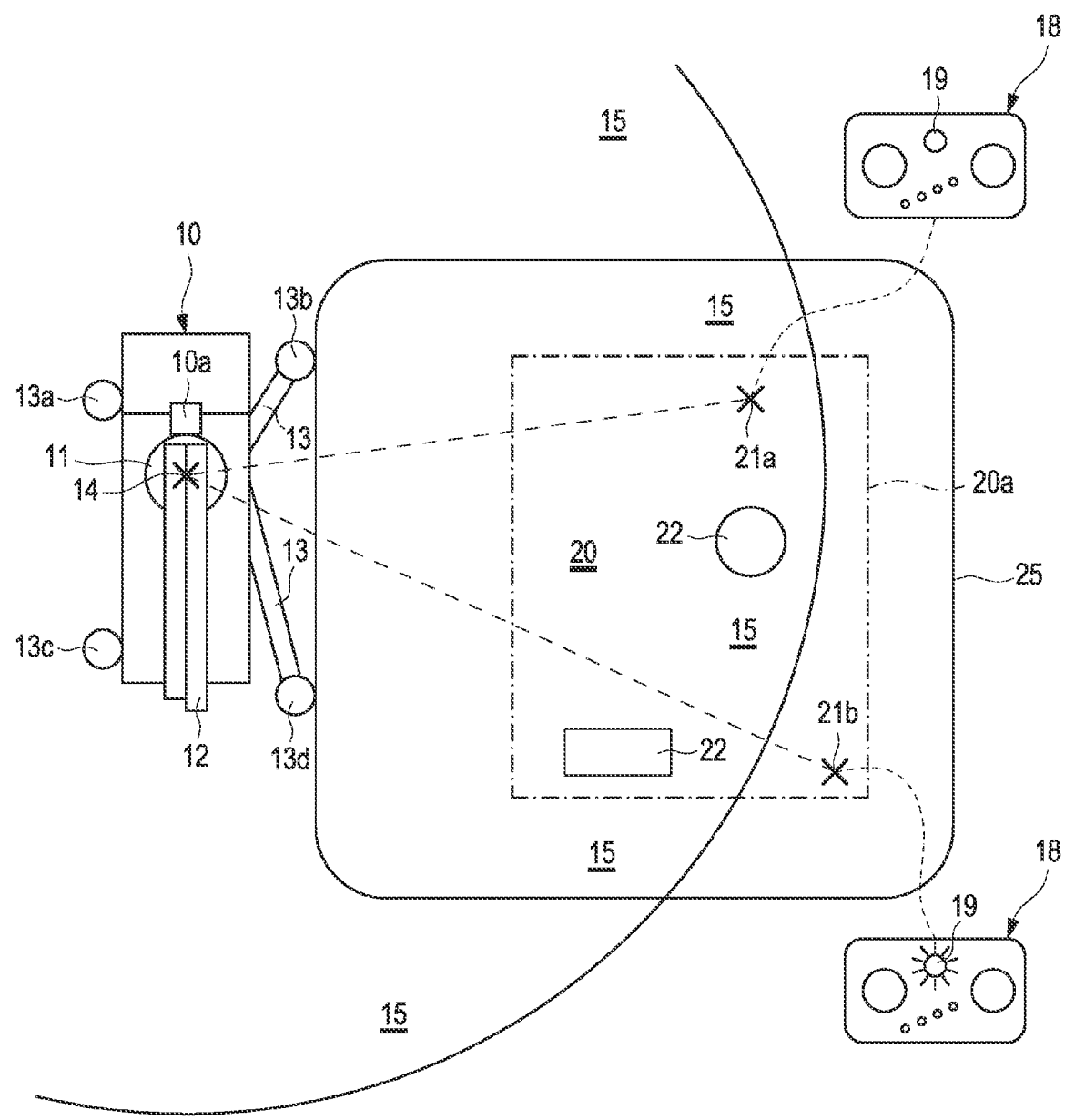
FIG. 1 shows the operating principle for detecting and verifying a working position of a mobile concrete pump.

FIG. 1 shows an aerial view of a mobile concrete pump 1 on a construction site. A surface 20 to be concreted is situated in a pit 25. The concrete pump 10 is parked in a set-up position 14 arranged outside the pit.

The mobile concrete pump 10 has a measuring device 10a which is designed so as to perform a method for detecting and verifying a working position of the concrete pump 10 on site before the concrete pump 10 starts to deliver concrete.

According to FIG. 1, the mobile concrete pump 10 takes the form of a truck-mounted concrete pump. Because of the aerial viewpoint, a truck chassis which is present and a pump system cannot be seen. A slewing gear 11 with a maximum pivot angle of more than 360° is arranged on the loading surface of the truck chassis. A placing boom 12 extends from the slewing gear 11. The placing boom 12 is shown in a folded-together state and comprises individual boom arms which are connected to one another via articulated joints.

The set-up position 14 of the mobile concrete pump 10 is, for the sake of simplicity, defined as a reference point as being the central pivot point of the slewing gear 11. It should be understood that the distance from any unit of the concrete pump 10, for example the measuring device 10a, can be measured and extrapolated back to the pivot point of the placing boom. Starting from the set-up position 14, the concrete pump 10 can serve an area in an essentially circular plane with concrete. This area is designated in FIG. 1 as the theoretical working range 15.

Four support legs 13 are provided on the side of the mobile concrete pump 10, wherein the support legs 13 each have support cylinders 13a, 13b, 13c, and 13d, illustrated with circles, at their ends. The support legs 13 are extended or folded out by a hydraulic control system (not illustrated). The illustrated concrete pump 10 is already situated in a supported state. The support setting is asymmetric with a greater support width on the side of the surface 20 to be concreted. In FIG. 1, the support surface is relatively narrow on the side of the surface 20 to be concreted because of the pit 25. The support setting shown of the concrete pump 10 gives the theoretical working range 15. The placing boom 12 can be moved safely within this working range 15 without the concrete pump 10 tipping over.

After the concrete pump 10 has been set up and supported, an operator does not yet know whether every point of the surface 20 to be concreted can be reached with the placing boom 13. Determining a set-up position and support is dependent solely on the estimation of an experienced operator and the circumstances of the local construction site. If it is not possible to serve the whole of the surface 20 to be concreted, the operator needs to reposition the machine and try to reach the remaining surface to be concreted from a different place. In order to avoid these time-consuming steps, the concrete pump 10 is equipped with a measuring device 10a which makes it possible to detect and verify the working position in advance.

Part of the measuring device 10a in this embodiment is a portable remote control unit 18 of the concrete pump 10. It is, however, also possible to use a wired remote control system or a mobile position-determining unit such as a commercially available cellphone with a GPS receiver, instead of the portable remote control unit 18. An operator walks over the surface 20 to be concreted inside the pit 25 with the portable remote control unit 18. It is then illustrated by way of example with the aid of working positions 21a and 21b.

At working position 21a, the operator measures the distance between the portable remote control unit 18 and the set-up position 14. The position can be determined mechanically, optically, using satellite technology, or using radio technology. This working distance to be measured is illustrated by the dashed line in FIG. 1.

The working distance can be determined, for example, by means of electro-optical distance measurement or laser distance measurement. The distance can here be determined, inter alia, using the duration or phase shift of the light, usually laser light. It is also possible to determine the distance by means of radio waves. Here an antenna emits short pulses and measures the time until the signal reflected by the measured object is received. It is thus also possible to measure the direction in which the object is situated in addition to the distance.

However, the distance is advantageously measured using geographical coordinates (GPS coordinates). The set-up position and working position can be determined using satellite technology, via a local GPS on the concrete pump or the construction site. The use of GPS coordinates is advantageous because a difference in height between the set-up position and the surface to be concreted can also be measured in addition to the working distance.

The recorded data are transmitted from the remote control unit 18 to the measuring device 10a, or vice versa, and then evaluated. The determined working distance is compared with the working range 15 resulting from the support setting.

If the working position 21a falls within the working range 15, this is indicated by outputting a corresponding signal 19 at the remote control unit 18, such as, for example, an LED (for example, a green LED) and is thus communicated to the operator.

The method can be repeated at one or more further working positions 21b. If the working position 21b does not fall within the working range 15 of the concrete pump 10, a signal 19 is likewise output at the remote control unit (for example, red LED) and the operator knows that the set-up position 14 or the support which has been set is suboptimal. The operator can thus move the concrete pump 10 to a better position before starting the delivery of the concrete.

This measurement can be repeated at any number of points of the surface to be concreted or directly adjacent thereto. Position-related data should advantageously be recorded on that side of the surface 20 to be concreted which is remote from the concrete pump 10 and, depending on the geometry of the surface 20 to be concreted, at various corner points. Obstacles 22 can also be measured. As soon as the operator reaches a working position 21a, 21b which lies outside the reach of the concrete pump, it is evident to him that it is not possible to serve the whole of the surface 20 to be concreted from the set-up position 14 of the concrete pump. The method can be repeated after the concrete pump 10 has been repositioned or a different support has been set.

The operator can also walk along the whole edge 20a of the surface 20 to be concreted and thus measure working positions either continuously at predefined discrete intervals or by manual input from the operator, for example specifically at corner points of the surface 20 to be concreted. The recorded data are communicated either continuously to the measuring device 10a or subsequently to the measuring device, should transmission during the recording not be possible. Any contours of the surface 20 to be concreted can be detected by continuous recording. Defined geometries such as lines, rectangles, etc. can be detected by means of intermittent recording.

The edge 20a of the surface 20 to be concreted can be completely detected by walking along it. Interfering contours 22 can thus also be detected either by walking over them or by manual input. In addition to information about the contours, the operator can define further information about the surface such as the amount of concrete to be placed, the required concrete quality, etc. For the sake of simplicity, the start and end of the recording are signaled by the operator by user interaction.

The measuring device 10a forms from the recorded measurement points an enclosed surface, which the operator can again confirm or reject by user interaction. The height of interfering contours 22 can be input later. The measuring device 10a calculates a so-called working task for the placing boom 12 from these data. A working task is understood to mean the task to be fulfilled, for example "apply concrete in the area of the surface to be concreted". Once the operator has put the placing boom 12 into automatic mode, the data are used to control the placing boom 12. The placing boom 12 approaches the surface 20 to be concreted and automatically performs its working task. When completing the concreting task, the actual coordinates of an end hose (not illustrated) attached to the placing boom are detected by the measuring device 10a and can be stored and processed. Moreover, by modifying the speed or by modifying the pumping rate, the automatic control of the concrete pump 10 can be influenced.

Figure 2:
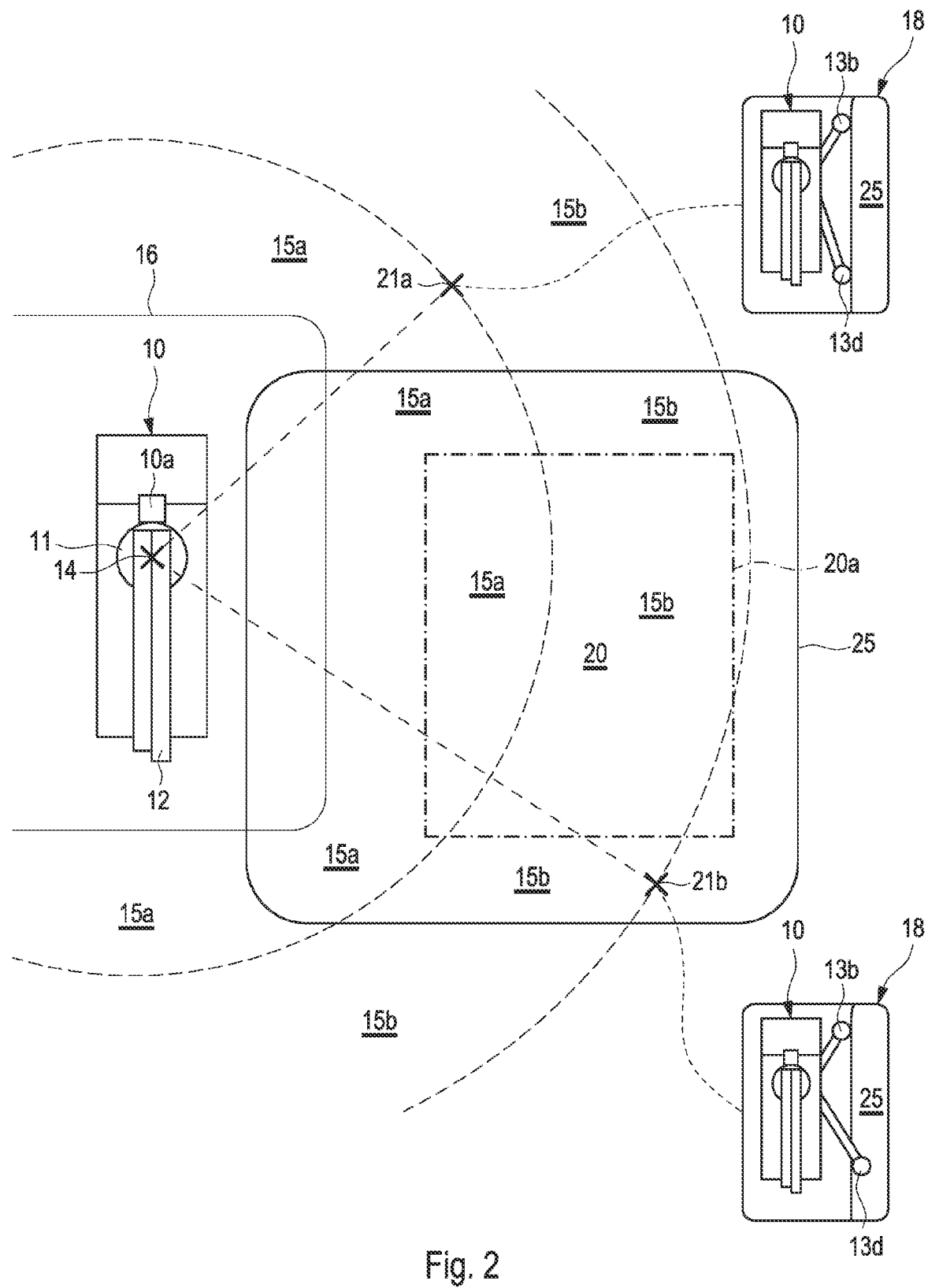
FIG. 2 shows the operating principle for determining a support setting of a mobile concrete pump.

FIG. 2 shows the operating principle of a method for determining a support setting of a mobile concrete pump 10.

The illustrated construction site is essentially identical to the construction site from FIG. 1. The operating principle also corresponds essentially to the operating principle shown in FIG. 1, with the difference that the concrete pump 10 is only set up at a set-up position 14 and its support has not yet been set. The different working ranges 15a and 15b indicated in FIG. 2 are the result of different support settings of the concrete pump. As described at the beginning, the setting of an optimum support for the concrete pump 10 requires an experienced operator and is highly dependent on the circumstances of the respective construction site. In the construction site illustrated in FIG. 2, the concrete pump 10 is set up next to a pit 25, which explains why the support surface on the side of the pit 25 is narrow.

An operator measures a large area around a surface 20 to be concreted with the aid of a portable remote control unit 18 or another device for detecting position-related data. A working distance between the set-up position 14 and the working position 21a is detected at a first working position 21a. The working distance corresponds to the smaller circular portion illustrated in a dashed line in FIG. 2. A display, on which the concrete pump in an aerial view together with the proposed appropriate support setting is indicated, is provided on the portable remote control unit 18 of the operator.

A support surface surrounding the concrete pump 10 is additionally pictured on the display. This is indicated by the illustration of the pit 25 on the display of the remote control unit 18. The immediate surroundings of the concrete pump 10 are visualized by one or more cameras which are provided on the concrete pump 10 and take an image of the camera area 16. The recorded image data can be sent directly to the remote control unit 18 and are used there to graphically illustrate the appropriate support position. In this way, an operator sees immediately whether a proposed appropriate support setting can indeed be implemented or whether it is precluded by obstacles on the construction site such as, for example, a pit 25. The support setting proposed for the working position 21a with regard to the support cylinders 13a and 13b has a sufficient spacing from the pit 25.

At the working position 21b there is a larger working distance from the set-up location 14, illustrated by the second circle in a dashed line. The working position 21b covers almost the whole surface 20 to be concreted. The optimum support determined on the basis of the working distance is indicated on the display of the lower remote control unit 18. As can be seen from the display, a setting of the proposed support is not possible because the lower support cylinder 13d is arranged inside the pit 25.

In the scenario illustrated in FIG. 2, the concrete pump 10 cannot cover the whole area 20 to be concreted from the set-up position 14. In this case, the operator should choose a different parking position because a wider support is not possible owing to the pit 25.

In principle, the surface 20 to be concreted can also be measured completely in this scenario and, after successfully setting a suitable support, the movement of the placing boom 12 can take place automatically.

The invention claimed is:

1. A method for detecting and verifying a working position of a mobile concrete pump including a placing boom, with the steps:
   setting up and at least partially supporting the concrete pump at a set-up position, at least partially supporting the concrete pump comprising moving one or more support legs from a driving position to a supporting position, the supporting position of the one or more support legs defining a support setting of the mobile concrete pump,
   detecting position-related data on a working position, said position-related date including a working distance between the set-up position and the working position, wherein the working position is arranged in an area, remote from the set-up position, of a surface to be concreted,
   comparing the position-related data with a theoretical working range of the concrete pump, derived from the support setting,
   outputting a signal indicating whether the working position can be served before movement of the placing boom from a folded-together state at the set-up position.

2. The method of claim 1, wherein position-related data are detected with the aid of GPS coordinates.

3. The method of claim 1, wherein the working distance between the working position and the set-up position is detected by light, such as a laser beam or radar.

4. The method of claim 1, wherein the method is repeated for different working positions inside or adjoining the surface to be concreted.

5. The method of claim 4, wherein working positions are measured along an edge of the surface to be concreted.

6. The method of claim 4, wherein position-related data are detected at multiple working positions continuously, at discrete intervals, or with input from a user.

7. The method of claim 1, wherein the surface to be concreted, including interfering contours, is interpolated using the position-related data.

8. The method of claim 1, wherein the signal or the support setting is output on a portable remote control unit.

9. A measuring device for detecting and verifying a working position of a mobile concrete pump designed to perform the method of claim 1.

10. A mobile concrete pump with a placing boom and a measuring device designed in claim 9.

11. The mobile concrete pump of claim 10, wherein the placing boom is guided at least partially automatically based on the position-related data on the area to be concreted.

12. A method for determining a suitable support setting of a mobile concrete pump, with the steps:
   setting up the concrete pump at a set-up position,
   detecting position-related data on a working position, said position-related data including a working distance between the set-up position and the working position,
   determining a support setting based on the position-related data of the working position, and
   outputting the support setting before supporting the concrete pump at the set-up position.

13. The method of claim 12, wherein the support setting is output with reference to a support surface on site, wherein the support surface is preferably detected by means of a camera arranged on the concrete pump.

14. The method of claim 12, wherein the support setting is projected onto the support surface on site by optical means provided on the concrete pump.

15. The method of claim 12, wherein position-related data are detected with the aid of GPS coordinates.

16. The method of claim 12, wherein the working distance between the working position and the set-up position is detected by light, such as a laser beam or radar.

17. The method of claim 12, wherein the method is repeated for different working positions inside or adjoining a surface to be concreted.

18. The method of claim 17, wherein working positions are measured along an edge of the surface to be concreted.

19. The method of claim 17, wherein position-related data are detected at multiple working positions continuously, at discrete intervals, or with input from a user.

20. The method of claim 12, wherein a surface to be concreted, including interfering contours, is interpolated using the position-related data.

21. The method of claim 12, wherein the support setting is output on a portable remote control unit.

22. A measuring device for detecting and verifying a working position of a mobile concrete pump designed to perform the method of claim 12.

23. A mobile concrete pump with a placing boom and the measuring device of claim 22.

24. The mobile concrete pump of claim 23, wherein the placing boom is guided on an area to be concreted at least partially automatically based on the position-related data.

* * * * *